United States Patent [19]

Kenjo

[11] Patent Number: 5,029,155
[45] Date of Patent: Jul. 2, 1991

[54] OPTICAL INFORMATION RECORDING/REPRODUCING APPARATUS IN WHICH RECORDING POWER IS SET PRIOR TO RECORDING

[75] Inventor: Hideyuki Kenjo, Koganei, Japan

[73] Assignee: Olympus Optical Co., Ltd., Tokyo, Japan

[21] Appl. No.: 272,961

[22] Filed: Nov. 18, 1988

[30] Foreign Application Priority Data

Nov. 19, 1987 [JP] Japan .................................. 62-293673
Oct. 21, 1988 [JP] Japan .................................. 63-266450

[51] Int. Cl.⁵ ............................................ G11B 7/125
[52] U.S. Cl. ..................................................... 369/116
[58] Field of Search .................... 369/54, 58, 100, 116; 346/76 L

[56]         References Cited
          U.S. PATENT DOCUMENTS

| 4,577,320 | 3/1986  | Yoshikawa et al. |        |
|-----------|---------|------------------|--------|
| 4,611,317 | 9/1986  | Takeuchi et al.  |        |
| 4,631,713 | 12/1986 | Romeas et al.    | 369/54 |
| 4,692,606 | 9/1987  | Sakai et al.     |        |
| 4,718,068 | 1/1988  | Yoshikawa.       |        |
| 4,747,091 | 5/1988  | Doi              | 369/116 |
| 4,755,980 | 7/1988  | Yoshimaru et al. | 369/54 |
| 4,796,250 | 1/1989  | Kobayashi et al. | 369/54 |
| 4,800,548 | 1/1989  | Koishi et al.    | 369/54 |
| 4,907,212 | 3/1990  | Pharris et al.   | 369/54 |
| 4,935,914 | 6/1990  | Morita et al.    | 369/54 |

Primary Examiner—Donald McElheny, Jr.
Attorney, Agent, or Firm—Armstrong, Nikaido, Marmelstein, Kubovcik, & Murray

[57]         ABSTRACT

Before recording of data in a data recording area is started, a laser is made to emit light at a power level represented by a directing value which corresponds to an objective value in an area other than the data recording area where recording emission is possible, and the intensity of light emitted at that time is detected by a monitor circuit. The detected write power level and the directing value are compared, and the directing value is corrected using the difference between these two values so as to set a write power directing value which approximates to the objective value. Thereafter, a laser emits light at a power level represented by this directing value in the data recording area.

19 Claims, 6 Drawing Sheets

FIG. 1
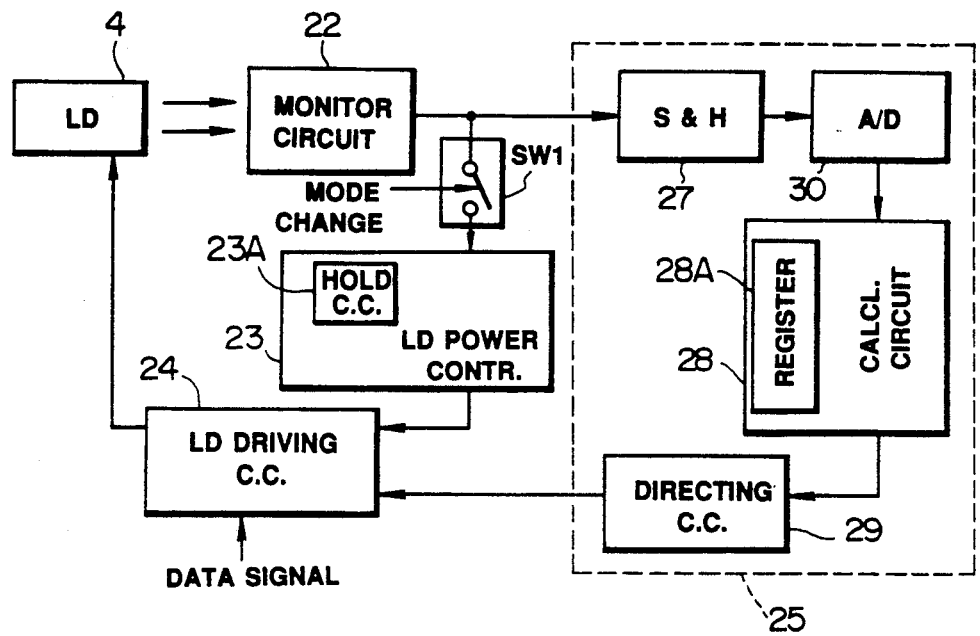
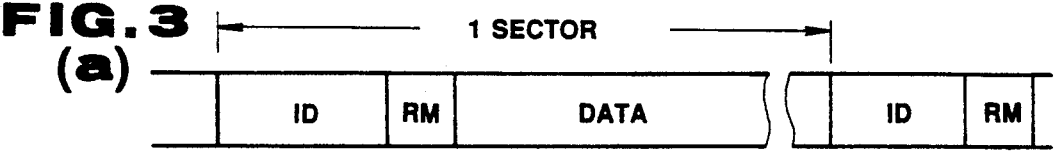
FIG. 3 (a)
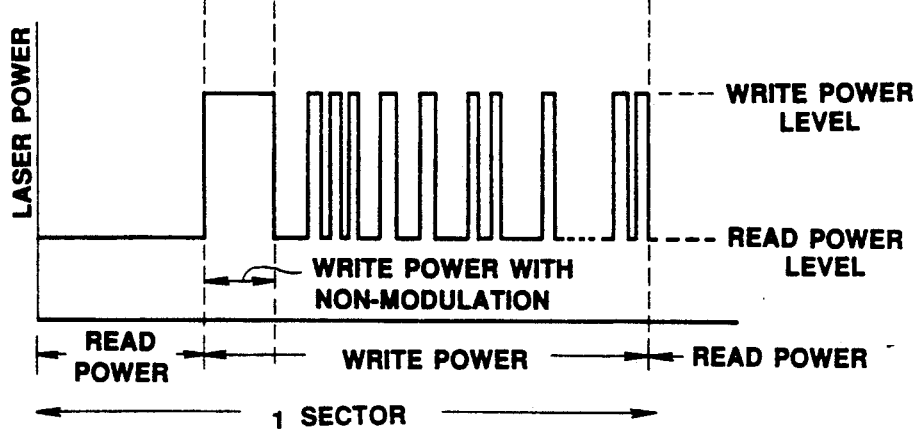
FIG. 3 (b)

OPTICAL INFORMATION RECORDING/REPRODUCING APPARATUS IN WHICH RECORDING POWER IS SET PRIOR TO RECORDING

BACKGROUND OF THE INVENTION

1. Field of the Invention

The present invention relates to an optical information recording/reproducing apparatus in which intense light is set to (held at) a level of power having an objective value before actual recording is started.

2. Description of the Related Art

Optical recording/reproducing apparatuses (hereinafter referred to as optical disk apparatuses) for recording information on or reproducing information from an optical recording medium (hereinafter referred to as an optical disk) by radiating an optical beam have recently been put into practical use.

In the above-described type of optical disk apparatus, an optical beam, emitted from a light source such as a semiconductor layer, is radiated on an optical disk having a light-sensitive thin metal film, a thermoplastic or an optical magnetic recording material provided on its surface in order to cause physical deformation of the optical disk or to change a property of the disk such as reflectivity or the direction of magnetization, by which means information is recorded at high density and the recorded information can when necessary be erased. The recorded information can be reproduced by detecting reflected or transmitted light.

As the density at which recording is effected has become higher in recent years, the recording data modulation system and the pulse recording system are leading technologies in the mainstream of optical disk apparatus development, and various methods of stabilizing the recording light power of a laser serving as a light source have been proposed, most of them involving A.P.C. (Automatic Power Control) in which the intensity of light emitted is monitored and controlled utilizing a feed-back loop when any recording light is to be emitted. However, this A.P.C. System has a problem in that highly accurate control is impossible in some cases, depending on the recording data modulation system employed. For the M$^2$FM modulation system, each data signal has, for example, a constant duty cycle, and A.P.C. is therefore attained by feeding back the average value of the monitor output of the light power. For the 2-7 modulation system, the duty cycle of each data signal is not constant, remarkably fluctuating the average value of the monitor output. In consequence, feed-back of the average value does not ensure a stable setting of the light power of a laser to an objective value.

This light power adjusting technique which utilizes feed-back is useful when an optical beam of constant intensity is emitted from a laser light source for reproduction or erasure. However, when information is recorded, a laser beam is modulated in response to the information to be recorded. As a result, where a signal to be fed back and controlled (hereinafter referred to as a feed-back signal) is obtained utilizing an average value detection, the output of a feed-back signal fluctuates in accordance with the average value for a modulated area in modulation methods other than the M$^2$FM and EFM methods, and stable light power control is therefore impossible if the fluctuation is intense. No problem arises with the M$^2$FM and EFM modulation methods because the average value for a certain area is substantially constant.

Accordingly, it has been proposed to peak hold the intensity of pulsed light emitted from a laser when a data is recorded and to perform feed-back on based this value so as to obtain an objective light power. However, as the speed at which data is recorded becomes higher, the interval during which a diode laser emits recording light becomes shorter, one of the shortest intervals at present being 100 nsec or less. This makes timing of peak holding or holding of an accurately calculated peak value for a very short period of time technically difficult.

More specifically, where a feed-back signal is obtained by a peak hold detection, each pulse has a width of about 100 nsec in the pulse recording of RZ and RB. It is therefore difficult to provide a circuit having a time constant which is capable of holding such a pulse signal, and it is impossible to obtain a stable feed-back signal.

SUMMARY OF THE INVENTION

An object of the present invention is to provide an optical information recording/reproducing apparatus which is capable of setting a level of light power suitable for recording.

Another object of the present invention is to provide a write light power control device and a write light power control method which are capable of setting a level of light power suitable for recording independently of the type of modulation method used in an information recording/reproducing apparatus.

Another object of the present invention is to provide a write light power control device/method which is capable of setting a level of light power suitable for recording without requiring a high-speed signal processing system.

In the present invention, before recording of data in a regular data recording area is started, a laser is made to emit light at a power level represented by a directing value which corresponds to an objective value in an area where recording emission is possible, and the intensity of light emitted is detected by a monitor. A difference between the detected light power and the objective value is calculated, and an actually detected power level is set to a directing value which has been corrected using the difference value. In consequence, it is possible to retain the intensity of light at a suitable objective value in a record mode, independently of the type of modulation method used.

BRIEF DESCRIPTION OF THE DRAWINGS

FIG. 1 is a block diagram of a light power control system, showing a first embodiment of the present invention;

FIGS. 3(a) & 3(b) illustrate a light emission which is performed when a data is recorded in a sector;

FIGS. 9(a), (b) & (c) illustrate a format of a recording medium including a recording mark portion and so on.

DETAILED DESCRIPTION OF THE PREFERRED EMBODIMENTS

Figure 2:
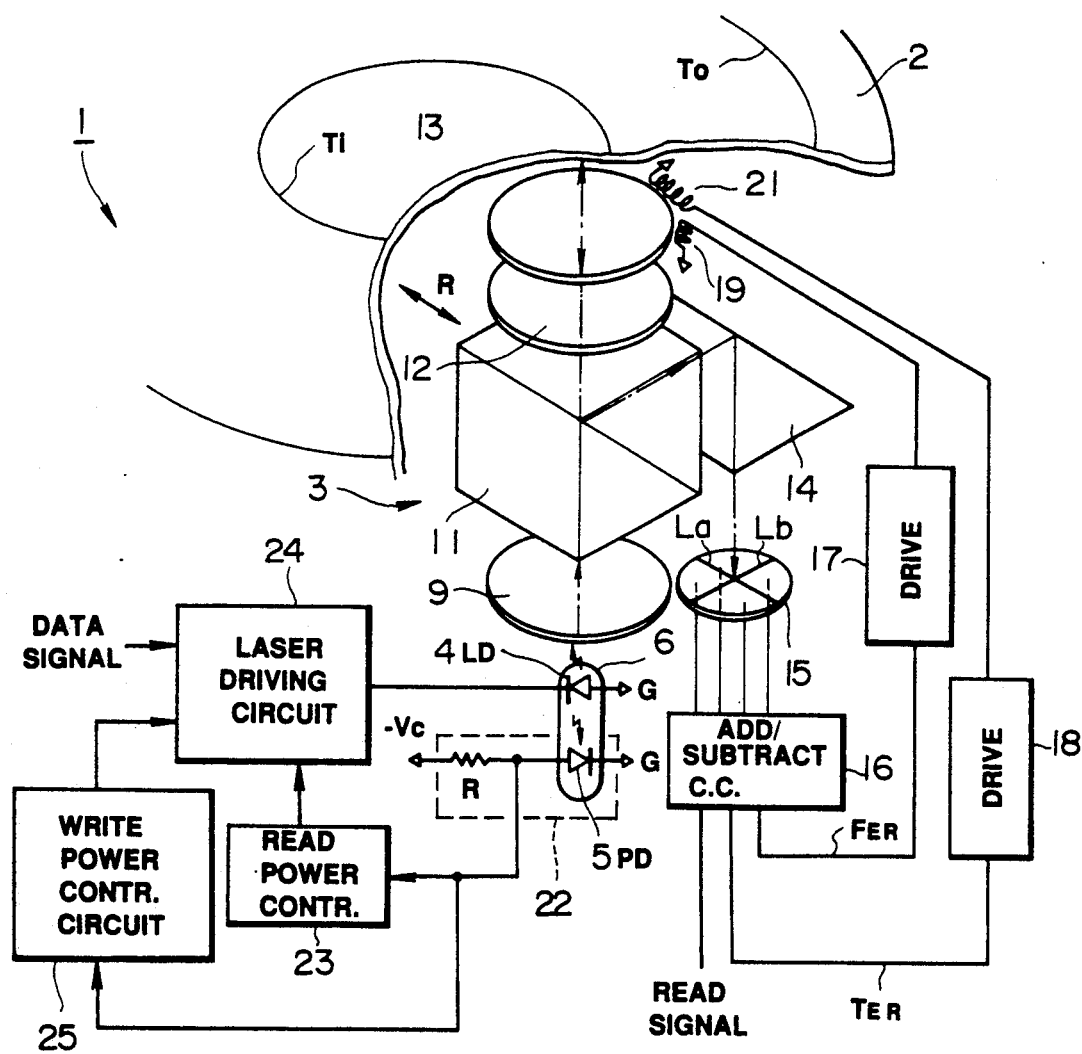
FIG. 2 is a schematic view of the first embodiment of the present invention.

As shown in FIG. 2, an optical disk apparatus 1 of a first embodiment includes an optical disk 2 which is driven by a spindle motor (not shown), and an optical pickup 3 which is disposed in such a manner that it faces the optical disk 2. The optical pickup 3 is mounted on a movable base (not shown) in such a manner as to be movable in the radial direction of the optical disk 2 indicated by an arrow R (in the direction it traverses the cencentric or spiral tracks of the optical disk 2) by an optical pickup moving means such as a voice coil motor.

The optical pickup 3 includes a diode laser 4. Information is recorded on and reproduced from the optical disk 2 by condensing and radiating an optical beam of the diode laser 4 on the optical disk 2. The diode laser 4 is sealed in a housing 6 together with a monitoring photodetector such as a pin photodiode 5. The laser beam which is emitted from the front surface of the diode laser 4 is used for recording and reproduction, while the laser beam emitted from the rear surface of the diode laser 4 is received by the pin photodiode 5. The photoelectrically converted output of the pin photodiode 5 is used for control of the light power of the diode laser 4.

In the optical pickup 3, the laser beam emitted from the front surface of the diode laser 4 which consists of diverging light rays is converted to a beam made up of parallel rays of light by a collimator lens 9, and a resultant beam is then made incident as a plane-polarized beam to a polarization beam splitter 11 which transmits substantially 100% of the beam incident. The light which has transmitted through the polarization beam splitter 11 enters a ¼ wave plate 12 where it is circularly polarized. This circularly polarized optical beam is then condensed by an objective lens 13 and the condensed beam irradiates the optical disk 2.

The light reflected by the optical disk 2 first passes through the objective lens 13. The light that has passed is plane-polarized by the ¼ wave plate 12, and the plane-polarized beam is made incident to the polarization beam splitter 11 which transmits substantially 100% of the beam incident. The light which has transmitted through the polarization beam splitter 11 enters a critical angle prism 14 where it is reflected by the inclined surface of the prism 14. The reflected beam is then received by a photodetector 15 disposed at a far field in such a manner that it faces the end surface of the prism 14 from which the optical beam goes out of the prism 14.

The optical detector 15 may be a 4-division light receiving element. The outputs of the optical detector 15 are input to an add/subtract circuit 16 where they are added to each other so as to obtain a reproducing signal. The add/substract circuit 16 also produces a focusing error signal $F_{ER}$ from a pair of differential outputs divided by a line La which runs parallel to the radial direction R, as well as a tracking error signal $T_{ER}$ from a pair of differential outputs divided by a line Lb which runs parallel to the tangential direction of a track. These error signals $F_{ER}$, $T_{ER}$ are respectively supplied to a focusing coil 19 and a tracking coil 21 through drive circuits 17 and 18 so as to form a servo system designed to keep the objective lens 12 focused and tracked.

The light power control means for controlling the light power of the diode laser 4 is constructed in the manner described below.

The light emitted from the diode laser 4 is input to the photodiode 5 which forms a monitor circuit 22. The anode of this photodiode 5 is connected to a negative power source −Vc through a resistance R, and the cathode thereof is connected to an analog GND. The anode of the photodiode 5 is at a potential which corresponds to the intensity of light which is received by the photodiode 5, which potential is the output of the monitor circuit 22. The monitor output of the monitor circuit 22 is input to a read power control circuit 23, which produces a laser light power control signal to control a current supplied from a laser drive circuit 24 to the diode laser 4. That is, the current which is supplied from the laser drive circuit 24 to the diode laser 4 is controlled by the control signal of the read power control circuit 23 in such a way that a level of power of the diode laser 4 is at a suitable value. This light power control is a control performed on reproducing light in a reproducing mode.

For the purpose of controlling the write power (of the light emitted to form pits) in the recording mode, the optical disk apparatus 1 of the first embodiment includes a write power control circuit 25 which produces a signal to control the write power of the diode laser.

FIG. 1 shows a light power control means which contains this write power control circuit 25.

The output of the monitor circuit 22 which represents the potential at the anode of the photodiode 5 is input to the read power control circuit 23 through a switch SW 1 and to a sample & hold circuit 27.

This sample & hold circuit 27 holds the output of the photodiode 5 (the monitor circuit) in a recording mark portion RM when the diode laser 4 emits light at a write power level. The recording mark portion RM is a recording area set beforehand within a sector in which data is recorded at a write power level, as shown in FIG. 3a. The recording mark portion RM is provided following an ID portion where a sector number within a track is read out at a read power level and in advance of a data portion where data is actually recorded (this recording mark portion RM may be provided at the beginning of each track). In the case where light is emitted from the laser at a write power level in this recording mark portion RM shown in FIGS. 3(a) & 3(b), a reproducing instruction may be issued when the ID portion preceding the recording mark portion RM is read out. If a recording medium used is of a disk type, the interval at which the ID portion is read out can be controlled because of the rotation of a disk at an equiangular speed. Therefore, emission of light in the RM portion may be performed when a time equivalent to that required for reading out the ID portion has elapsed following the output of the reproducing instruction using a known means such as a multivibrator. Alternatively, a signal representing the beginning of an RM may be recorded at the end of an ID portion or at the beginning of an RM, and emission of light may be performed when this signal is detected. The laser emits light at a write power level in this recording mark portion RM when a directing value, which has been set beforehand in a register 28A or the like in a calculation circuit 28 in correspondence to an objective value of the write power, is output to a directing circuit 29 where it is converted to an analog signal and this analog signal is input to the laser drive circuit 24. The light emitted from the laser in the recording mark portion RM may be a non-modulated light of 10 μsec. In this embodiment, the recording mark portion RM is used to determine whether or not the level of the write power of the laser is at a value suitable to a data portion before actual recording of data in that data portion is started. If it is determined that the write power is not at the optimal value, the directing value of the write power level, which is stored in the register 28A or the like, is adjusted so that data is recorded at the optimal power level.

The output of the sample & hold circuit 27 is converted to a digital signal by an A/D conversion circuit 30, and the resultant digital signal is then input to the calculation circuit 28.

The calculation circuit 28 compares the digital output of the monitor circuit 22, which has been received through the A/D conversion circuit 30, with the initially output power level directing value. If there is a difference between these two outputs, the calculation circuit 28 corrects the initial directing value by adding that difference value to the directing value so as to obtain a directing value which is an objective value for each sector.

Figure 4:
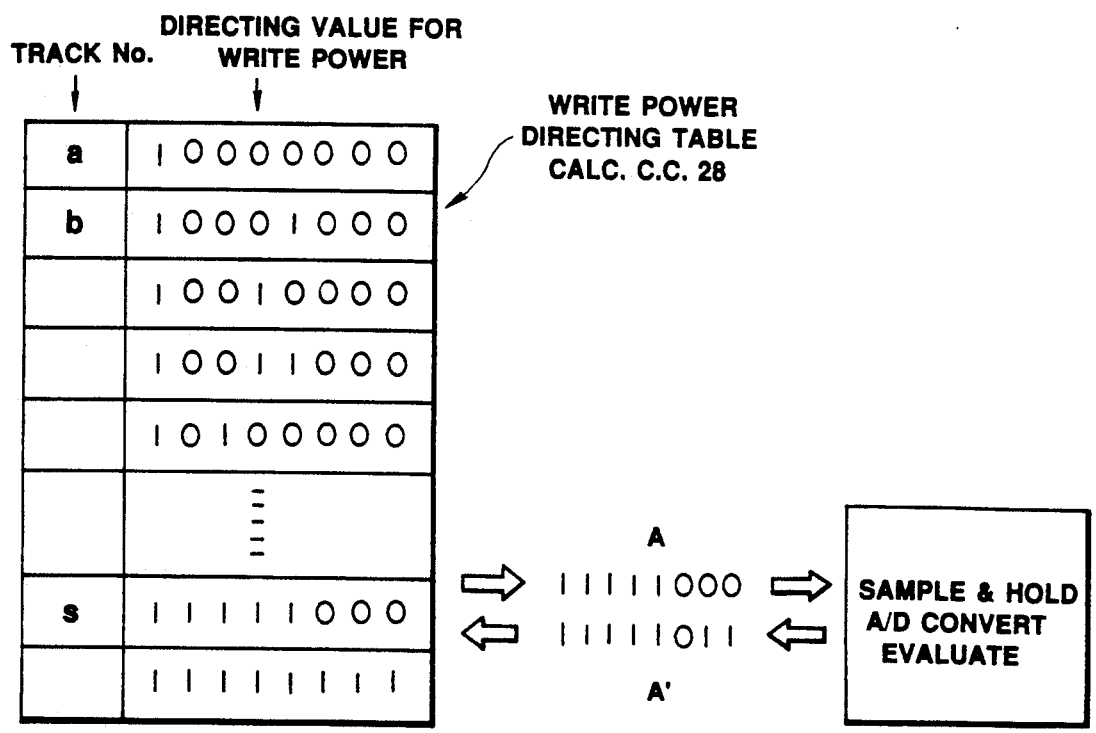
FIG. 4 illustrates a light emission which is performed using a write power directing table, as well as correction of a write power directing value.

The above-described correction will be performed in the manner described below using a write power directing table shown in FIG. 4. This table is stored in the register 28A of the calculation circuit 28 and contains the directing values necessary when the laser is made to emit light at power levels suitable for individual tracks of the optical disk 2. In this directing table, directing values which correspond to objective values of the power levels are allocated for individual concentric track Nos, a, b, . . . , s . . . . When a recording mark portion RM is reached in one of the sectors in the track No. s, the diode laser 4 is actually made to emit a non-modulated light at a level of power represented by an initial directing value data A "11111000" assigned to the track No. s. The intensity of light emitted from the diode laser 4 at this time is detected by the monitor circuit 22, and the detected value is sampled by the sample & hold circuit 27. The sampled value is input to the calculation circuit 28 through the A/D conversion circuit 30. The calculation circuit 28 determines whether or not the power level actually detected when the laser is made to emit light at the power level represented by the above-described directing value data A, "11111000", is identical to an objective directing value. If it is, no updating of the directing value A in the directing table is carried out. If these two levels are different, the calculation circuit 28 adds the difference to the directing value A and thereby changes the directing value A in the directing table to a directing value A'. Subsequently, the laser is caused to emit light at a write power level represented by this directing value A'. FIG. 4 shows a case where the actually detected level represented by the directing value A is slightly lower than an objective value, and this directing value A is corrected to "11111011" in order to compensate for this difference.

The write power for a sector is set to a value suitable for that sector while the corresponding recording mark portion RM is being scanned. Accordingly, the recording of data in a data portion subsequent to this recording mark portion RM is performed using a directing value which corresponds to the objective value, and data is recorded at a power level suitable to that data portion, as shown in FIG. 3b. Data is recorded by a data signal which is input to the laser drive circuit 34 from an external controller (not shown). A high level of the data signal corresponds to a write power level, and a low level of the data signal represents a read power level. In this case, recording of data is performed in an open loop which does not use feedback. However, it is possible to maintain the power level at a highly accurate and stable value because the time required to record data in a sector is short and because the above-described light power control is performed for each sector. It is therefore possible to perform recording at a desirable power level even when a recording method in which the duty ratio is not constant is used.

In other words, it is possible to record data at a power level suitable for recording when an information recording/reproducing apparatus uses any modulation method for recording.

The first embodiment is also effective when the characteristics of the light emitting diode laser 4 are dependent on changes in temperature.

The switch SW1 shown in FIG. 1 is turned on and off by a mode change-over signal. In the reproducing mode, the switch is on, and stabilization of the read power is performed by the A.P.C system. The switch SW1 is off in the recording mode. At this time, the output level of the monitor circuit 22 is held by a holding circuit 23A in the read power control circuit 23, and the signal level which is held by the holding circuit 23A is input to the laser drive circuit 24 to determine the read power level in the recording mode. A sample & hold circuit or a low-pass filter may be used as the holding circuit.

The above-described first embodiment uses a simplified monitor circuit 22. A diode laser compatible with another diode laser in which the efficiency thereof is normalized such that the power level and the monitor output have a fixed relationship may also be used.

Since the time required to record data in one track is short and since changes in the power level due to changes in temperature can be kept low when data is recorded over several tracks, control of the power level may be performed in a recording mark portion RM in a sector in the first recording track of the several tracks in which recording is to be performed, the directing value thus obtained being used thereafter.

Data is recorded in any track on the optical disk. After data has been recorded in any one track (e.g., in the innermost track of the optical disk), a track separate from this track (e.g., the outermost track of the optical disk) may be sought so as to record data therein. In that case, since the change in the intensity of light emitted at the innermost and outermost tracks of the optical disk is linear, the difference generated in the innermost track is the same as that generated in the outermost track, and the directing value for the outermost track which has been corrected using this difference may be output.

Where a recording mark portion is provided for each sector, the setting of the directing value to a value representing the optimal power may be performed over several sectors. For example, when data is to be recorded in a data portion of a certain sector, a laser is made to emit light using a directing value in the first recording mark portion RM in the several sectors which precede that sector value, with the power level which is actually obtained being input to a calculation circuit through a monitor circuit where it is determined whether or not there is a difference between the two levels. Thereafter, the data portion in that sector is scanned at the read power level, and the above-described setting is again performed in a recording mark portion RM in a following sector. This method requires only an A/D conversion circuit and a calculation circuit which operate at low speed. The output signal of the monitor circuit may be directly converted to a digital signal without passing through a sample & hold circuit. A recording mark portion RM may also be shorted.

Whereas the first embodiment involves a digital light power control, a second embodiment which is described below relates to an analog light power control.

Figure 5:
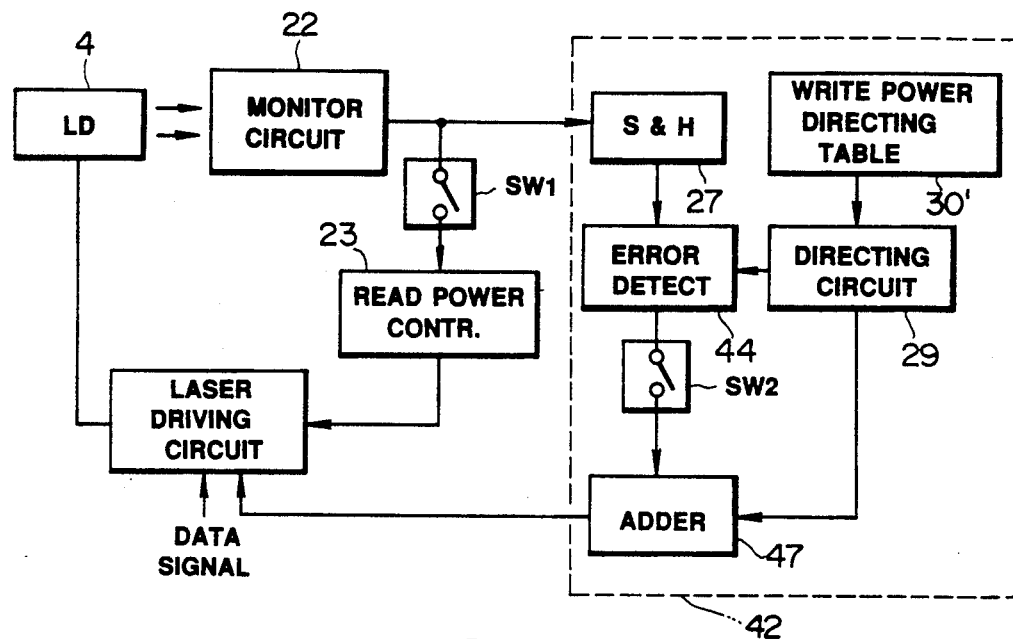
FIG. 5 is a block diagram of a light power control system, showing a second embodiment of the present invention.
Figure 6:
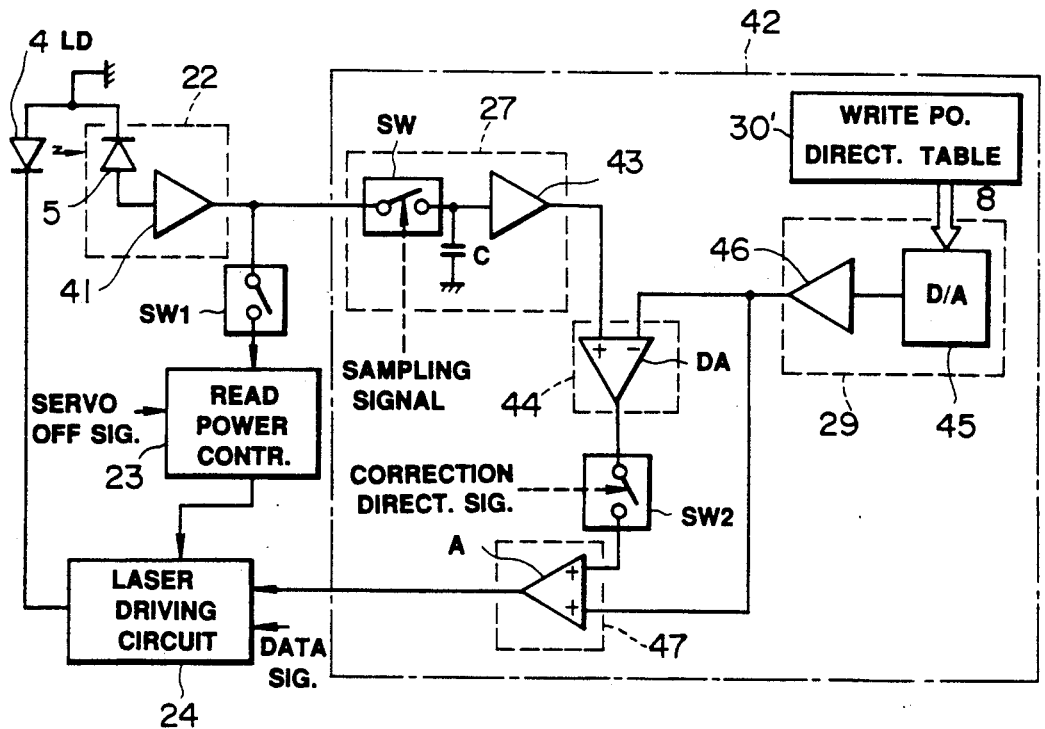
FIG. 6 is a schematic view of the second embodiment of the present invention.

FIG. 5 is a block diagram of a light power control system in an optical disk apparatus of a second embodiment according to the present invention, and FIG. 6 is a structure of the light power control system of FIG. 5.

As shown in FIG. 6, light which is emitted from the rear surface of the diode laser 4 is received by the pin diode 5, and the output of the pin diode 5 is amplified by an amplifer 41 which produces a monitor signal.

This monitor signal is input to the sample & hold circuit 27 which is a component of an analog write power control circuit 42, and to the read power control circuit 23.

Figure 7:
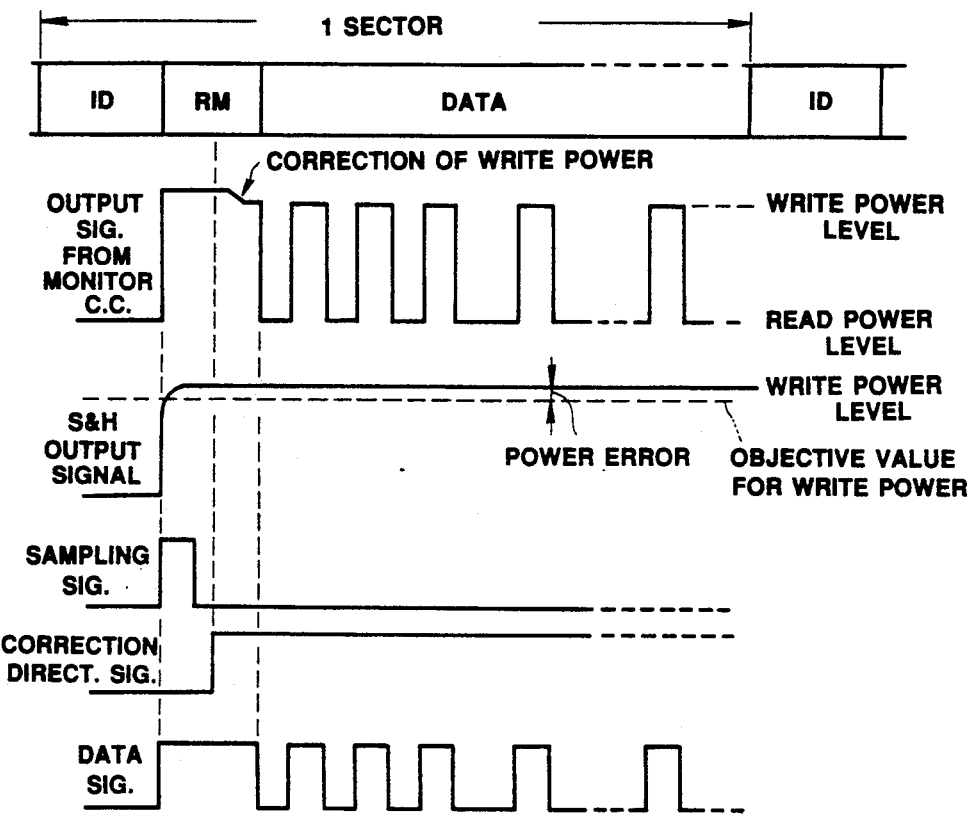
FIG. 7 illustrates a light emission performed for recording in the second embodiment.

The sample & hold circuit 27 consists of an analog switch SW which is turned on and off by a sampling signal, a holding capacitor C connected between the output terminal of the sample & hold circuit and ground, and a buffer amplifier 43 which produces an output signal of the sample & hold circuit. The sample & hold circuit 27 holds the output signal of the monitor circuit 22 which is obtained when the laser is actually made to emit light in the recording mark portion RM in a similar manner to that of the first embodiment. When the laser emits light in the recording mark portion RM, a sampling signal having a pulse width shorter than the scanning interval of the recording mark portion RM is output concurrently with the emission, as shown in FIG. 7. The output signal of the sample & hold circuit 27 is input to a differential amplifier DA (or a subtractor) which constitutes an error detecting circuit 44 which produces an error signal which represents a difference between the output signal of the sample & hold circuit 27 and a directing level of the directing circuit 29. In other words, when the output of the directing circuit 29 is an objective value of the write power, the differential amplifier produces the difference between this objective value and an actually obtained write power level. The directing circuit 29 includes a D/A converter 45 to which an 8-bit write power directing value is input from a write power directing circuit 30' which may be a ROM, and a buffer amplifier 46 which produces an analog write power directing value which has been converted by the D/A converter 45. A write power directing level which is output from this buffer amplifier 46 is applied to the other input terminal of the differential amplifier DA, which outputs an error signal.

The write power directing table 30' contains the A/D converted values of voltages that appear in the monitor signals when a light is emitted from the laser at, for example, 9 mW. Since the write power level obtained in the above-described emission differs over an optical disk, the A/D converted values of the voltages of the monitor signals obtained in the manner described above at various positions of the optical disk are set in the table 30'. The values in this table are objective values of the write power, and are also used as directing values.

The error signal which is output from the error detecting circuit 44 is input to an addition amplifier A, which constitutes an addition circuit 47 through a switch SW2 turned on and off by a correction directing signal, and is added to the write power directing level (when the switch SW2 is on). A corrected write power directing signal is input to the laser drive circuit 24.

More specifically, the output of the error detecting circuit 44 represents a correcting value, and this correcting value is added to the write power directing level by the addition circuit 47 so as to obtain a corrected write power directing signal which is to be input to the laser drive circuit 24.

Upon receipt of this corrected write power directing signal, the laser, drive circuit 24 supplies a current to the diode laser based on this directing signal, and makes the diode laser 4 emit light at an objective write power level.

The light emitted in the above-described recording mark portion RM is a non-modulated light of about 10 $\mu$sec. In this second embodiment, a sampling pulse is output at the beginning of the recording mark portion RM so as to make the sample & hold circuit 27 hold an actually detected write power level. After it has been held, a correction directing signal is output to turn on the switch SW2 and thereby deliver a correcting value signal from the error detecting circuit 44 to the addition circuit 47 where it is added to the write power directing level to produce a corrected write power directing signal within the scanning interval of the recording mark portion RM, as shown in FIG. 7.

A servo-off signal is applied to the read power control circuit 23 during recording emission, and the monitor signal held by this circuit 23 is output to the laser drive circuit 24 by this servo-off signal. The switch 1 is on in the reading mode and is off in the recording mode (the switch SW1 may also be turned on and off by a servo-off signal. Alternatively, the switch SW1 may be turned off immediately after the monitor signal is held by this servo-off signal).

The laser drive circuit 24 outputs to the diode laser 4 a driving current pulse to cause the diode laser 4 to emit light at a power level which changes between the read power level and the write power level in response to a data signal.

The operation of the second embodiment will be described below.

In the reproducing mode, the monitor signal of the monitor circuit 22 is input to the read power control circuit 23 through the switch SW1, and the diode laser 4 is made to emit light through the laser driving circuit 24 by a driving current which corresponds to the output level of this read power control circuit 23.

This read power control circuit 23 includes a means for outputting an objective read power level (e.g., a reference voltage generating means). In the read mode, the read power control circuit 23 performs A.P.C. in which the read power control circuit 23 detects the difference between this objective power level and the the monitor signal of the monitor circuit 22, and delivers that difference signal to the laser drive circuit 24 through a low-pass filter which also serves as a sample & hold circuit so as to make the diode laser 4 emit light at a read power level of about 1 mW.

In this read mode, the sample & hold circuit 27 is not in operation (for example, the switch SW is off), and the switch SW2 is also off.

When the mode is changed over to recording mode, a servo off signal is output to turn off the switch SW1, and the sample & hold circuit (in this case, a low-pass filter) in the read power control circuit 23 thereby holds a read power directing value which has been input immediately before the output of the servo off signal. This output of the read power control circuit 23 is input to the laser drive circuit 24, and the laser drive circuit 24 delivers to the diode laser a drive current (see FIG. 7) which determines the read power level of the laser in the record mode on the basis of this input.

In an actual recording, a drive current representing the write power level is superimposed on a drive current representing the read power level.

In the recording mode, a write power directing value (e.g., a directing value which consists of an 8-bit data) is input from the write power directing table 30' to the D/A converter 45 in the directing circuit 29 where it is converted to an analog value, and a resultant analog value is output from the buffer amplifier 46 as an objective value of the write power. This objective value also serves as a write power directing value, and is therefore input to the differential amplifier DA and to the addition amplifier A. The output of this addition amplifier A alone is input to the laser drive circuit 24 as the write power directing value because the switch SW2 is off.

After the ID portion in a sector where the recording of data is to be performed has been scanned at the read power level, the laser is caused to emit light at the write power level in the recording mark portion RM by outputting a high level of data signal. Concurrently with this emission, a sampling signal having a pulse width of about 2 to 3 μsec is applied to the switch SW to turn on the switch SW and make the capacitor C hold a peak value of the monitor signal. This peak value is input through the buffer amplifier 43 to the differential amplifier DA, and the differential amplifier DA produces a signal representing the difference between the objective value of the write power and an actually obtained write power. About 1 or 2 μsec after the sampling signal has been turned off, a correction directing signal is applied to the switch SW2 to turn on this switch SW2 and pass the output of the differential amplifier DA to the addition amplifier A, and the addition amplifier A performs correction of the write power and sends a corrected write power directing signal to the laser driving circuit 24. As a result, as shown in FIG. 7, a power error generated between the output signal of the sample & hold circuit 27 and the objective value of the write power is cancelled by the output of the correction directing signal and the addition of the correcting value, and hence the laser emits light at the objective value. The cancellation of this power error is performed while the recording mark portion RM is being scanned, so that data can be recorded at the objective value in a data portion following this recording mark portion RM. In other words, since the objective value is set to the optimal value, recording of data can be performed at the optimal write power in the data portion.

The second embodiment has the following advantage in addition to that of the first embodiment.

In the first embodiment, after the level of power has been held and this analog value has been converted to a digital value, this digital value is compared with the objective value of the power level which is stored in the table so as to obtain a difference between these two values, and the objective value is then updated using this difference value so that the difference is cancelled. This process executed in the first embodiment ensures the setting of the optimal write power with a high degree of accuracy. However, it takes much time, and in some cases the setting of the write power level of the laser to an objective value may not be completed during the scanning interval of the recording mark portion RM, depending on the length of the recording mark portion RM, whereas in the second embodiment the setting of the power level of the laser at an objective value is possible within the scanning interval of a recording mark portion RM having a length of about 10 m which is shown in the first embodiment.

Figure 8:
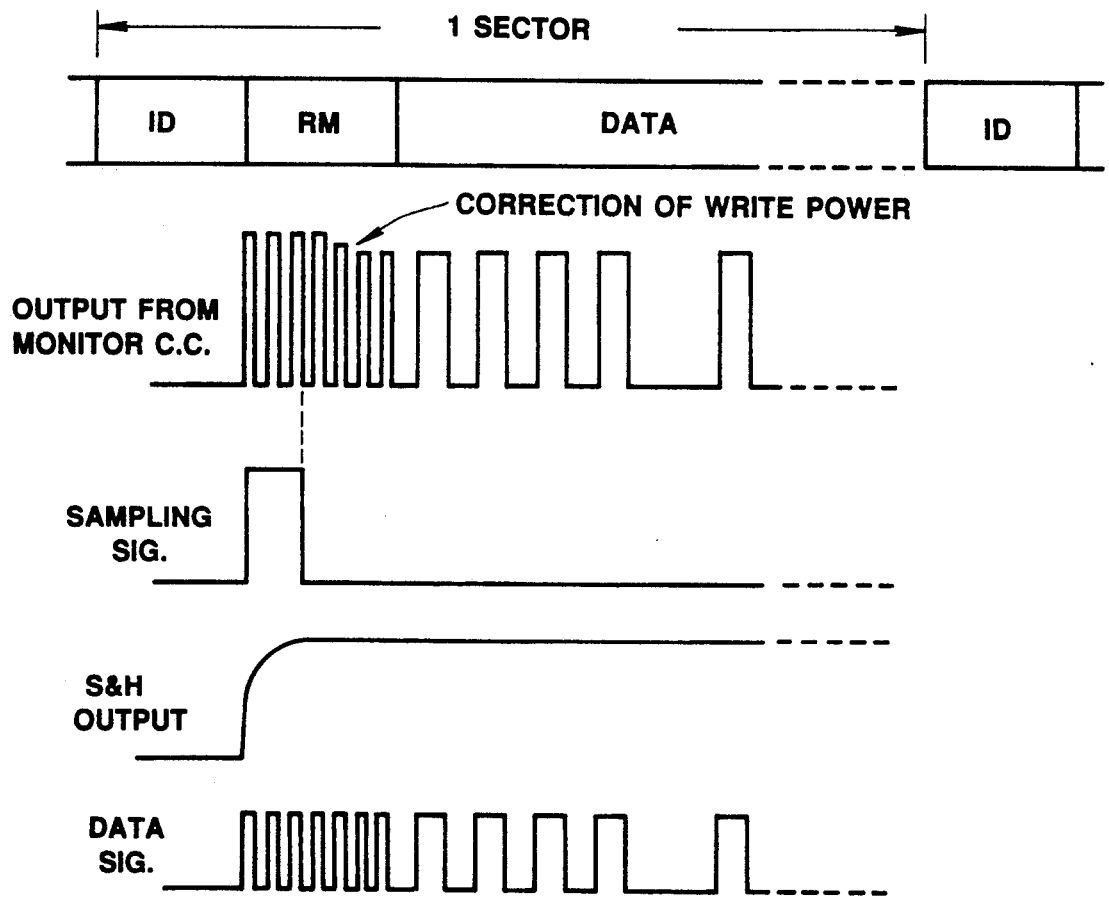
FIG. 8 illustrates a light emission performed for recording in a third embodiment of the present invention.

FIG. 8 shows the operation of a third embodiment of the present invention.

In this embodiment, the light emitted in a recording mark portion RM is in the form of a train of pulses having a duty cycle of 50%, unlike the non-modulated light emitted in the recording mark portion RM in the second embodiment. More specifically, since a data signal which is output in the recording mark portion RM is in the form of a train of pulses having a duty cycle of 50%, the monitor circuit 22 for receiving the light emitted by the diode laser 4 by this pulse train also produces a monitor signal in the form of a pulse train, as shown in FIG. 8. This monitor signal is integrated by the sample & hold circuit 27 so as to allow a peak value thereof to be obtained. Subsequent to the sample & hold circuit 27, the same process as that in the second embodiment is carried out to generate a corrected power level directing signal.

In the third embodiment, pulses having a cycle of 50% are used. However, this cycle is not limited to 50% but pulses having any duty cycle are used so long as it is a stable value. In other words, the duty cycle of the pulses may be set to any value if it is possible to obtain a peak value of the output signal of the sample & hold circuit when the signal is modulated using a modulated signal. Further, a peak value may be detected by a peak value detecting circuit without using a sample & hold circuit.

Figure 9A:
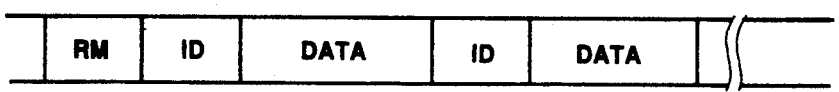

FIGS. 9(a), (b) & (c) illustrate examples of location of a recording mark portion RM which is an area where a laser emits light at a write power.

Figure 9B:
Figure 9C:

A recording mark portion RM may be located at the beginning of each track, as shown in FIG. 9a. It may also be located for every several sectors, as shown in FIG. 9b (in this example, it is provided for every two sectors). Alternatively, it may be located for each sector in advance of each ID portion, as shown in FIG. 9c.

In the above-described embodiments, since the time required to record data in one track is short and since changes in the power level due to changes in temperature can be kept low when data is recorded over several tracks, control of the power level may be performed in a recording mark portion RM in a sector in the first recording track of the several tracks in which recording is to be performed.

In other words, a correction directing signal may be output for each recording mark portion RM or every a plurality of recording mark portions RM to perform control of the write power. In either case, a correction directing signal is output after a predetermined time has elapsed following the output of a sampling signal.

Correction of the write power which is started in a certain recording mark portion RM may not be completed within that recording mark portion RM but may be completed in a following recording mark portion RM.

An area in which a level of light power of the laser is set by actually making the laser emit light is not limited to a recording mark portion RM but the outside of the innermost track Ti or the outside of the outermost track To of a data recording area, i.e., the inner side of the innermost track Ti or the outer side of the outermost track To, may also be used as that area.

Where the output level of the error detection circuit 44 becomes high when a laser emits light at a corrected power level, the light emitting characteristics of the diode laser 4 may change. In that case, change in the level of an error signal may be known of by inputting the output level of the error detecting circuit 44 to a window type comparator which determines whether or not the shift of the error signal is within a defined value.

The above-described embodiments may be combined to provide another embodiments.

What is claimed is:

1. An optical information recording/reproducing apparatus comprising:
    a diode laser for radiating a laser beam;
    a driving circuit, outputting to said diode laser, a driving current which corresponds to a level of a signal input thereto to make said diode laser emit light;
    an optical pickup including an optical system for condensing and irradiating said laser beam onto a recording medium;
    a means for outputting an area directing signal to make said diode laser emit light in an open loop in an area on said recording medium other than a data recording area where recording emission is possible, prior to actual recording;
    a write power directing value setting means for setting an objective value of a write power level at which said diode laser emits light in said open loop in said area and for outputting a power level directing value signal which corresponds to said objective value;
    a monitor signal generating means for receiving the laser beam which said diode laser emits in said area and for outputting a monitor signal having a level corresponding to an intensity of the light received; and
    a write power correcting means for updating said objective value using said monitor signal and said power level directing value signal such that the level of said monitor signal approximates said objective value.

2. An optical information recording/reproducing apparatus according to claim 1, wherein said write power objective value setting means is a semiconductor memory which contains said objective value.

3. An optical information recording/reproducing apparatus according to either of claims 1 or 2, wherein said write power correcting means is an operating/processing means for operating a difference between said monitor signal and said power level directing value signal and for updating contents of a table containing digital data of said power level directing value signal using said difference.

4. An optical information recording/reproducing apparatus according to claim 1, wherein said area is a buffer area provided on a same track on which said data recording area is provided.

5. An optical information recording/reproducing apparatus according to claim 1, wherein said area is an area provided on an inner side of an innermost one of said data recording area.

6. An optical information recording/reproducing apparatus according to claim 1, wherein said area is an area provided on an outer side of an outermost one of said data recording area.

7. An optical information recording/reproducing apparatus according to claim 1 wherein said light emitted by said laser diode is in a form of a pulse train.

8. An optical information recording/reproducing apparatus according to claim 1, wherein during reproducing, an emission power level of said diode laser is controlled based on said level of said monitor signal.

9. An optical information recording/reproducing apparatus according to claim 1, further comprising a storing means for storing said objective value and said laser diode is driven by an output of said storing means and an adding signal of said power level directing value signal.

10. An optical information recording/reproducing apparatus according to claim 1, a location of said data recording area is detected by said means and said objective value is updated based on said location.

11. An optical information recording/reproducing apparatus according to claim 1, wherein said laser beam emitted in said area is a DC output of a level corresponding to light level at a time of recording.

12. An optical information recording/reproducing apparatus according to claim 1, wherein said laser beam emitted in said area is an AC output of a level corresponding to light level at a time of recording.

13. A method of setting a write power level, comprising:
    a first step of making a diode laser emit light using a power level directing value, which corresponds to an objective value, in an area on a recording medium other than a data recording area where recording emission is possible;
    a second step of detecting a level of power at which said diode laser emits light in said first step and outputting a detection signal as a monitor signal;
    a third step of comparing said monitor signal with said power level directing value and outputting a signal representing a difference between said two signals; and
    a fourth step of mixing said difference signal with said power level directing value and outputting a corrected power level directing value.

14. A method of setting a write power level according to claim 13, wherein said third step includes a step of sampling and holding said monitor signal, and a step of subtracting the monitor signal, which is sampled and held, and said power level directing value.

15. A method of setting a write power level according to claim 13, wherein said fourth step involves outputting said corrected power level directing value signal after a predetermined time has elapsed following said sampling step.

16. A method of setting a write power level according to any one of claims 13 to 15, wherein said first step involves emission of non-modulated light.

17. A method of setting a write power level according to any one of claims 13 to 15, wherein said first step involves emission of light which is modulated by a pulse having a predetermined duty cycle.

18. An optical information recording/reproducing apparatus comprising:

a diode laser for radiating a laser beam;

a driving circuit, outputting to said diode laser, a driving current which corresponds to a level of a signal input thereto to make said diode laser emit light;

an optical pickup including an optical system for condensing and irradiating said laser beam onto a recording medium;

a means for outputting an area directing signal to make said diode laser emit light in an area on said recording medium other than a data recording area where recording emission is possible;

a write power objective value setting means for setting an objective value of a write power level at which said diode laser emits light in said area and for outputting a power level directing value signal which corresponds to said objective value;

a monitor signal generating means for receiving the laser beam which said diode laser emits in said area and for outputting a monitor signal having a level corresponding to an intensity of the light received; and a write power correcting means for updating said objective value using said monitor signal and said power level directing value signal such that the level of said monitor signal approximates said objective value, said write power correcting means includes an error detecting means for calculating a difference between said monitor signal and said power level directing value signal, and a mixed value outputting means for mixing an output signal of said error detecting means with said power level directing value signal and for outputting a corrected directing value signal.

19. An optical information recording/reproducing apparatus comprising:

a diode laser for radiating a laser beam;

a driving circuit, outputting to said diode laser, a driving current which corresponds to a level of a signal input thereto to make said diode laser emit light;

an optical pickup including an optical system for condensing and irradiating said laser beam onto a recording medium;

a means for outputting an area directing signal to make said diode laser emit light in an area on said recording medium other than a data recording area where recording emission is possible;

a write power objective value setting means for setting an objective value of a write power level at which said diode laser emits light in said area and for outputting a power level directing value signal which corresponds to said objective value;

a monitor signal generating means for receiving the laser beam which said diode laser emits in said area and for outputting a monitor signal having a level corresponding to an intensity of the light received; and a write power correcting means for updating said objective value using said monitor signal and said power level directing value signal such that the level of said monitor signal approximates said objective value, said write power correcting means includes an error detecting means for calculating a difference between said monitor signal and said power level directing value signal, said error detecting means has a sample and hold circuit for sample holding said monitor signal, and a differential amplifier for calculating a difference between an output of said sample and hold circuit and said power level directing value signal and a mixed value outputting means for mixing an output signal of said error detecting means with said power level directing value signal and for outputting a corrected power level directing value signal.

* * * * *